United States Patent
Gustavson et al.

(10) Patent No.: US 8,527,571 B2
(45) Date of Patent: Sep. 3, 2013

(54) METHOD AND STRUCTURE FOR PRODUCING HIGH PERFORMANCE LINEAR ALGEBRA ROUTINES USING COMPOSITE BLOCKING BASED ON L1 CACHE SIZE

(75) Inventors: Fred Gehrung Gustavson, Briarcliff Manor, NY (US); John A. Gunnels, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 12/341,718

(22) Filed: Dec. 22, 2008

(65) Prior Publication Data

US 2009/0106343 A1   Apr. 23, 2009

Related U.S. Application Data

(63) Continuation of application No. 10/671,887, filed on Sep. 29, 2003, now Pat. No. 7,487,195.

(51) Int. Cl.
    *G06F 7/38*    (2006.01)
(52) U.S. Cl.
    USPC ............................. 708/520; 708/446; 708/307
(58) Field of Classification Search
    USPC .................................. 708/466, 514, 520, 607
    See application file for complete search history.

(56) References Cited

U.S. PATENT DOCUMENTS

| | | | |
|---|---|---|---|
| 5,025,407 | A | 6/1991 | Gulley et al. |
| 5,099,447 | A | 3/1992 | Myszewski |
| 5,513,366 | A | 4/1996 | Agarwal et al. |
| 5,644,517 | A | 7/1997 | Ho |
| 5,825,677 | A | 10/1998 | Agarwal et al. |
| 5,944,819 | A | 8/1999 | Kumar et al. |
| 5,983,230 | A | 11/1999 | Gilbert et al. |
| 6,021,420 | A | 2/2000 | Takamuki |
| 6,115,730 | A | 9/2000 | Dhablania et al. |
| 6,357,041 | B1 | 3/2002 | Pingali et al. |
| 6,470,368 | B1 | 10/2002 | Garg et al. |
| 6,507,892 | B1 | 1/2003 | Mulla et al. |
| 6,601,080 | B1 | 7/2003 | Garg |
| 6,675,106 | B1 | 1/2004 | Keenan et al. |
| 7,028,168 | B2 | 4/2006 | Wadleigh |
| 7,031,994 | B2 | 4/2006 | Lao et al. |
| 7,487,195 | B2 * | 2/2009 | Gustavson et al. ........... 708/520 |
| 2003/0088600 | A1 | 5/2003 | Lao et al. |
| 2004/0148324 | A1 | 7/2004 | Garg |

OTHER PUBLICATIONS

Vinod et al., A Framework for high performance matrix multiplication based on hierarchical abstractions, algorithms and optimized low-level kernels, 2002, Concurrency and Computation: Practice and Experience 14(10): 805-839.

"Improving performance of linear algebra algorithms for dense matrices, using algorithmic prefetch". R. C. Agarwal, F. G. Gustavson, M. Zubair; IBM Journal of Research and Development: vol. 38, Issue 3 (May 1994); oages 265-275; Year of Publication: 1994.

(Continued)

*Primary Examiner* — Chuong D Ngo
(74) *Attorney, Agent, or Firm* — Daniel P. Morris; McGinn IP Law Group, PLLC

(57) ABSTRACT

A method (and structure) for performing a matrix subroutine, includes storing data for a matrix subroutine call in a computer memory in an increment block size that is based on a cache size.

17 Claims, 3 Drawing Sheets

(56) References Cited

OTHER PUBLICATIONS

Gunnels, et al. "A Family of high-performance matrix multiplication algorithms", ICCS 2001, LNCS 2073, pp. 51-60. 2001 (also available at http://www.cs.utexas.edu/users/flame/pubs/ICCS2001.pdf).

Gunnels et al. "A Novel theoretical model produces matrix multiplication algorithms that predict current practice", IBM Research Report RC 23443 (WO411-176), Nov. 19, 2004.

Phillip et al. PLAPACK: Parallel Linear Algebra Package Design Overview, 1997, IEEE Proceedings of the ACM/IEEE SC 97 Conference.

Agarwal et al., A High performance algorithm using pre-processing for the sparse matrix-vector multiplication, 1992, IEEE, pp. 32-41.

Vol. 1, "Foundations of computer-aided chemical process design" Copyright 1981, American Institute of Chemical Engineering (2-volume series), pp. 77-143.).

"Improving performance of linear algebra algorithms for dense matrices, using algorithmic prefetch", R. C. Agarwal, F. G. Gustavson, M. Zubair: IBM Journal of Research and Development; vol. 38, Issue 3 (May 1994); p. 265-275; Year of Publication: 1994.

Fred G. Gustavson and Andre Henricksson and Isak Jonsson and Bo Kagstrom and Per Ling: Superscaler GEMM-based Level 3 BLAS The On-going Evolution of a Portable and High-Performance Library (1998): Applied Parallel Computing, Published 1998, Springer, pp. 207-215.

* cited by examiner

METHOD AND STRUCTURE FOR PRODUCING HIGH PERFORMANCE LINEAR ALGEBRA ROUTINES USING COMPOSITE BLOCKING BASED ON L1 CACHE SIZE

The present application is a continuation application of U.S. patent application Ser. No. 10/671,887, filed on Sep. 29, 2003, now U.S. Pat. No. 7,487,195, having issue date of Feb. 3, 2009.

CROSS-REFERENCE TO RELATED APPLICATIONS

The following seven applications, including the present application, are related:
1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE", now U.S. Pat. No. 7,487,195, issued on Feb. 3, 2009;
2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL PACKED STORAGE FORMAT", now U.S. Pat. No. 7,386,582, issued on Jun. 10, 2008;
3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT", now U.S. Pat. No. 7,469,266, issued on Dec. 23, 2008;
4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES", now abandoned;
5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS", now U.S. Pat. No. 7,571,435, issued on Aug. 4, 2009;
6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES", now U.S. Pat. No. 7,490,120, issued on Feb. 10, 2009; and
7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING", now U.S. Pat. No. 7,475,101, issued on Jan. 6, 2009, all assigned to the present assignee, and all incorporated herein by reference.

BACKGROUND OF THE INVENTION

1. Field of the Invention

The present invention relates generally to a technique for improving performance for linear algebra routines. More specifically, matrix data is stored into and retrieved from memory in a block size that is related to the size of the L1 cache, such as 2NB-by-NB/2, where $NB^2$ is a fraction of the size of the L1 cache.

2. Description of the Related Art

Scientific computing relies heavily on linear algebra. In fact, the whole field of engineering and scientific computing takes advantage of linear algebra for computations. Linear algebra routines are also used in games and graphics rendering.

Typically, these linear algebra routines reside in a math library of a computer system that utilizes one or more linear algebra routines as a part of its processing. Linear algebra is also heavily used in analytic methods that include applications such as supply chain management, as well as numeric data mining and economic methods and models.

A number of methods have been used to improve performance from new or existing computer architectures for linear algebra routines. However, because linear algebra permeates so many calculations and applications, a need continues to exist to optimize performance of matrix processing. Prior to the present invention, no optimal method and structure as described herein has been proposed.

More specific to the technique of the present invention and as recognized by the present inventors, performance loss occurs for linear algebra processing when the size of the L1 cache is not considered.

SUMMARY OF THE INVENTION

In view of the foregoing problems, drawbacks, disadvantages and unfulfilled need in the art, it is an exemplary feature of the present invention to provide a technique that improves performance for executing linear algebra routines and subroutines, as based on storing data for matrix operations in a memory block size and format consistent with L1 cache size and replacement policy and FPU register structure.

It is another exemplary feature of the present invention to deal with new computer architectures and assembly languages in a better manner than previous methods and to demonstrate a general methodology that can be employed to take advantage of architectural features.

To achieve the above exemplary features and as an improvement over the current conventional methods of performing matrix computation, in a first exemplary aspect of the present invention, described herein is a method of performing a matrix computation, including storing data for a matrix subroutine call in a computer memory in an increment block size that is based on a cache size.

In a second exemplary aspect, also described herein is an apparatus including a processor capable of processing a matrix subroutine, a cache associated with the processor, and a memory, wherein the memory stores data for memory calls for the matrix subroutine in an increment block size that is based on a size of the cache.

In a third exemplary aspect, also described herein is a signal-bearing medium tangibly embodying a program of machine-readable instructions executable by a digital processing apparatus, the instructions including a method of storing data for a matrix subroutine call in a computer memory in an increment block size that is based on a cache size.

In a fourth exemplary aspect, also described herein is a method of solving a problem using linear algebra, including at least one of: initiating a computerized method of performing one or more matrix subroutines, wherein the computerized method comprises storing data for a matrix subroutine call in a computer memory in an increment block size that is based on the L1 cache size; transmitting a report from the computerized method via at least one of an internet interconnection and a hard copy; receiving a report from the computerized method; and providing a consultation to solve the problem that utilizes the computerized method.

In a fifth aspect of the present invention, also described herein is a method of providing a service, using the method described herein related to linear algebra processing.

BRIEF DESCRIPTION OF THE DRAWINGS

The foregoing and other objects, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
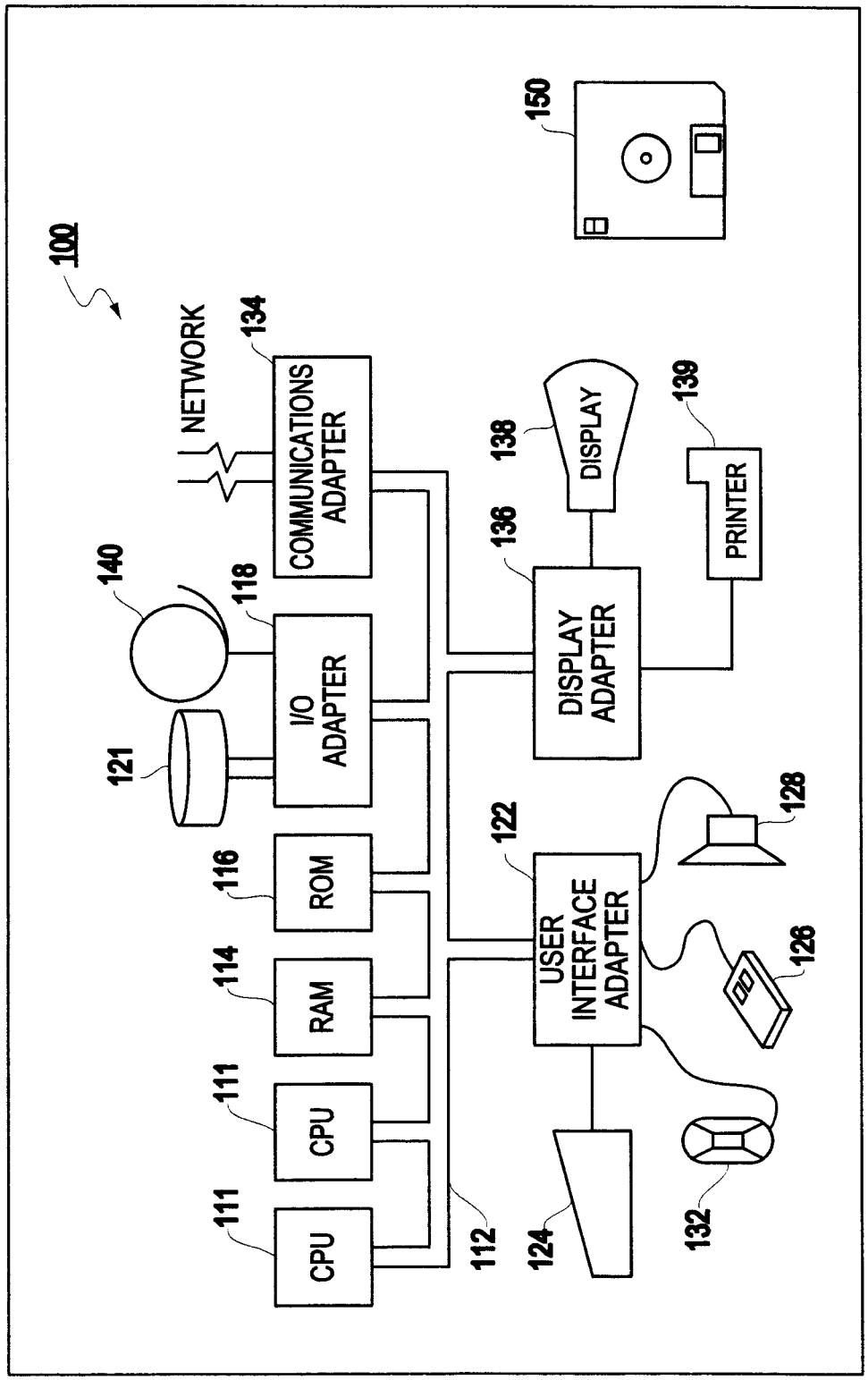
FIG. 1 illustrates an exemplary hardware/information handling system 100 for incorporating the present invention therein.

Referring now to the drawings, and more particularly to FIG. 1, in which is illustrated a typical hardware configuration of an information handling/computer system 100 usable with the present invention, and which computer system 100 has at least one processor or central processing unit (CPU) 111. It is noted that this schematic computer architecture of FIG. 1 is for purpose of illustration only and that any number of variations are possible, including various parallel-processing architectures.

In the exemplary architecture of FIG. 1, the CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting an information handling system to a data processing network, the Internet, an Intranet, a personal area network (PAN), etc., and a display adapter 136 for connecting the bus 112 to a display device 138 and/or printer 139 (e.g., a digital printer or the like).

Figure 2:
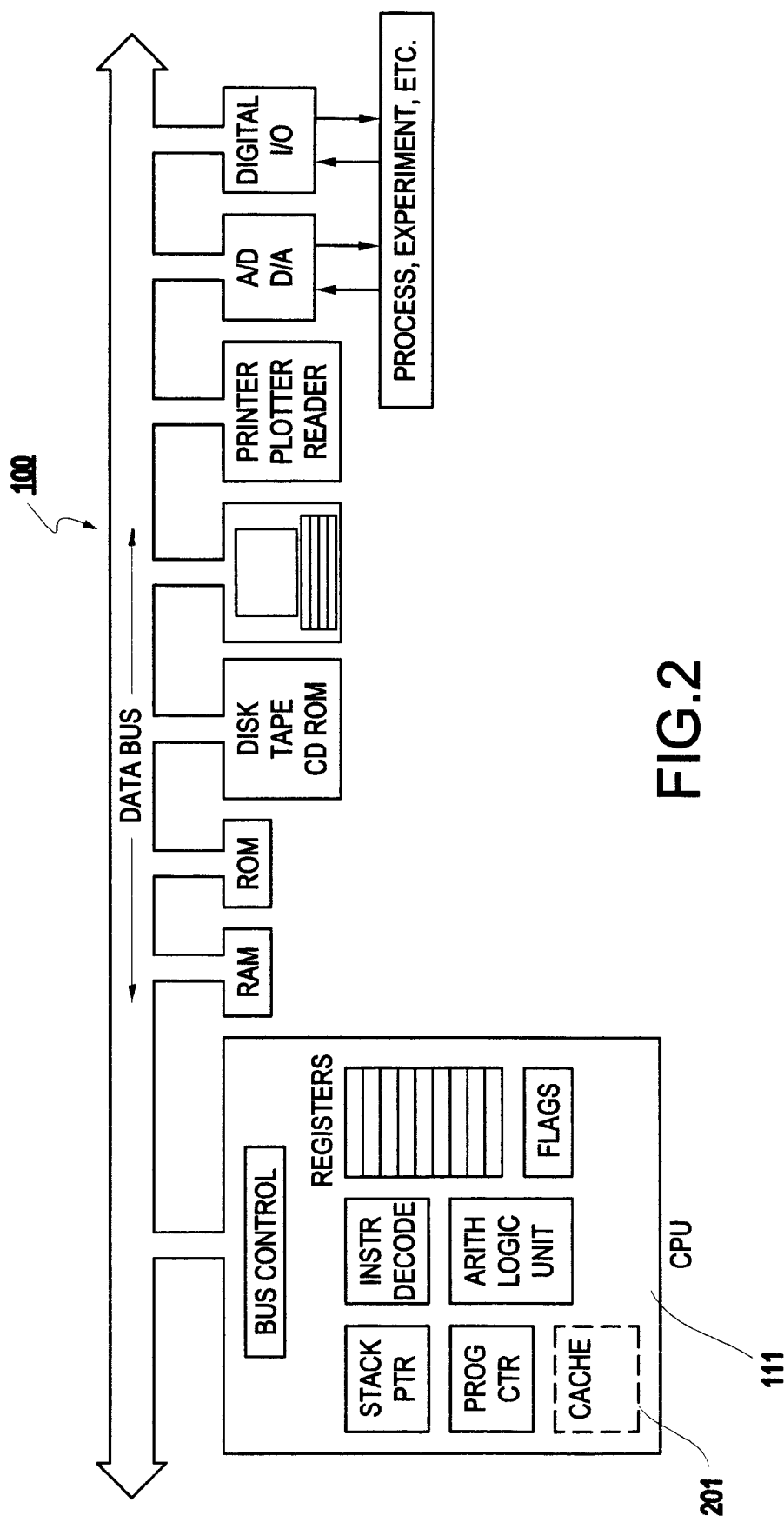
FIG. 2 exemplarily illustrates in more detail a Central Processing Unit (CPU) 111 that might be used in the computer system 100 that utilizes the present invention by basing matrix processing in block sizes based on a dimension of an L1 cache 201.

An important aspect of the present invention relates to computer architecture that incorporates a memory hierarchy involving one or more cache memories. FIG. 2 shows in more detail how the computer system 100 might incorporate a cache 201 in the CPU 111, and more specifically, a level 1 cache ("L1 cache"). Level 1 cache is considered as being a cache that is closest to the CPU (and in most cases the fastest memory that requires the least access cycle time) and may be separated from or may be included as a component of the CPU 111, as shown in FIG. 2. Higher level caches, such as level 2 cache and level 3 cache, would typically indicate successively higher levels of cache, and each successively higher level would require a correspondingly higher access time.

However, the details of the cache structure and the precise location of the cache(s) is not so important to the present invention. It is important to note, however, that memory is hierarchical in nature in modern computer architectures, and that matrix computation can be enhanced considerably by modifying the processing of matrix subroutines to include considerations of the memory hierarchy, and more specifically, the L1 cache, as meaning the cache closest to the processor.

The following description of the present invention includes reference to the current computing standard called "LAPACK" (Linear Algebra PACKage) and to various subroutines contained therein. Information concerning this standard is readily available on the Internet.

When LAPACK is executed, the Basic Linear Algebra Subprograms (BLAS), unique for each computer architecture and provided by the computer vendor, are invoked. LAPACK comprises a number of factorization algorithms, routines and subroutines that will be further mentioned below.

However, it should be noted that the present invention is more generic than LAPACK, as one of skill in the art would recognize after having taken the present invention as a whole. The present invention is intended to cover the broader concepts discussed herein and contend that the specific environment involving LAPACK is intended only for purpose of illustration rather than limitation.

It should also be noted that the discussion below of the present invention uses the terminology "double blocking". However, the present invention is more general than this exemplary embodiment and is not intended to be so limited, as would be readily recognized by one of ordinary skill in the art.

The Concept of Double Blocking

The present invention teaches a method of "double blocking" that provides the ability to perform matrix multiplication subroutines more efficiently by retrieving data in units based on the size of the cache (e.g., the L1 cache in the exemplary embodiment, but, of course, other caches are envisioned as well). Of particular interest is the cache closest to the machine calculating unit, such as a Central Processing Unit (CPU) or Floating Point Unit (FPU).

Dense Linear Algebra Factorization Algorithms (DLAFAs) include matrix multiply subroutine calls such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is Double-precision A Transpose multiplied by B (DATB), that is, $C=C-A^T*B$, where A, B, and C are generic matrices or submatrices, and the symbology $A^T$ means the transpose of matrix A. It is noted that DATB is the usual kernel type employed by today's state of the art codes, although DATB is only one of six possible kernel types. It is also noted that, in general, the initial letter "D" of the kernel abbreviation means "Double-precision".

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and a transposed matrix is equivalent to a matrix stored in row-major order. Because of asymmetry (C is both read and written), K1 is usually made to be greater than M1, as this choice leads to superior performance.

A DLAFA preferably uses square blocking, and submatrices are selected to be square subsections of the original matrix. A primary reason for emphasis on square blocking is that, to solve systems, the number of unknowns is equal to the number of equations, which inherently becomes expressed as a square matrix.

Another factor governing performance is that of the data structure or structures employed. For DATB, it is desirable to preferably employ a data structure that is optimal for the level 3 L1 kernel type, yet also encompasses the entire original matrix and accommodates the aforementioned square blocking. An important question centers around the issue of satisfying two apparently disparate requirements: square blocking for factorization and non-square blocking for the major part of the same algorithm, namely the DATB operation.

The concept of "double blocking", as taught by the present invention, provides a solution to this problem. For purpose of demonstration, M1=K1=NB is simplistically assumed as being the size of an L1 cache block. A 2NB by 2NB block of data would be four times the size of an L1 cache block and, thus, four times too large to offer optimal performance.

Figure 3:
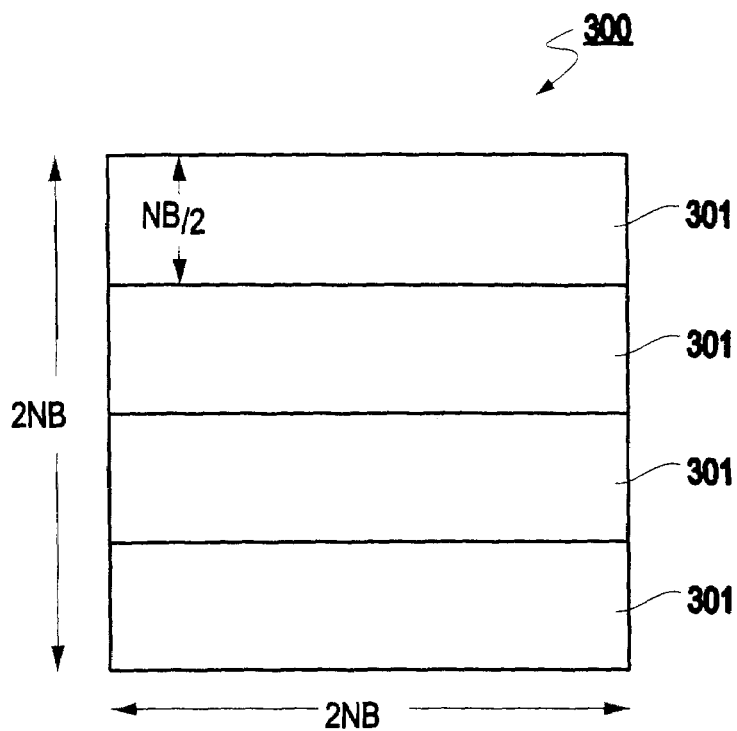
FIG. 3 illustrates a concept of block size 300 to be used in matrix subroutine processing, according to the present invention.

However, as shown in FIG. 3, this 2NB by 2NB block 300 can also be viewed as including a plurality (e.g., four) rectangles 301 of size NB/2 by 2NB. By adopting this view and delimiting the submatrix in a corresponding fashion, the level 3 L1 kernel DATB can be called four separate times. Each of the four NB/2 by 2NB sub-rectangles 301, which are stored row-wise, is preferably contiguous in memory and map well into the L1 cache.

That is, these four memory blocks 301 are optimally constructed for the peak performance of the level 3 L1 kernel DATB. It should be noted, that, while C, also a submatrix of A, is not contiguous in memory for this DATB operation, the penalty incurred is small, since C is loaded and stored in the outer loop of the code and, therefore, less frequently than the other operands.

Turning now to other parts of the codes that make up a DLAFA, these other parts include other level 3 L1 kernels for level 3 BLAS, such as DSYRK, DTRSM, DTRMM, etc., as well as a myriad of factor kernels. For examples, there are LU=PA (Gaussian Elimination with partial pivoting), LL^T=A (Cholesky factorization of a symmetric positive definite matrix), QR=A (orthogonal factorization of a general matrix), etc.

As mentioned above, the "D" in the above-mentioned acronyms means Double-precision floating-point numbers are being used in the level 3 BLAS. The acronym DSYRK, therefore, stands for Double-precision SYmmetric Rank K update. DTRSM stands for Double-precision TRiangular Solve Multiple, and DTRMM stands for Double-precision TRiangular Matrix Matrix (multiplication). These level 3 BLAS are intended only as examples and are well known in the art, so that additional details are not required for understanding the present invention.

Like the L1 level 3 DATB, it may be necessary to repartition the square blocks of size 2NB by 2NB as sub-blocks so that each of the level 3 factorization kernels mentioned above will run at or near their peak possible rate. Nonetheless, these other kernel computations are, relatively rare. More precisely, the number of calls to the other kernels is an order of magnitude less than the number of calls to the level 3 L1 DATB kernel.

Figure 4:
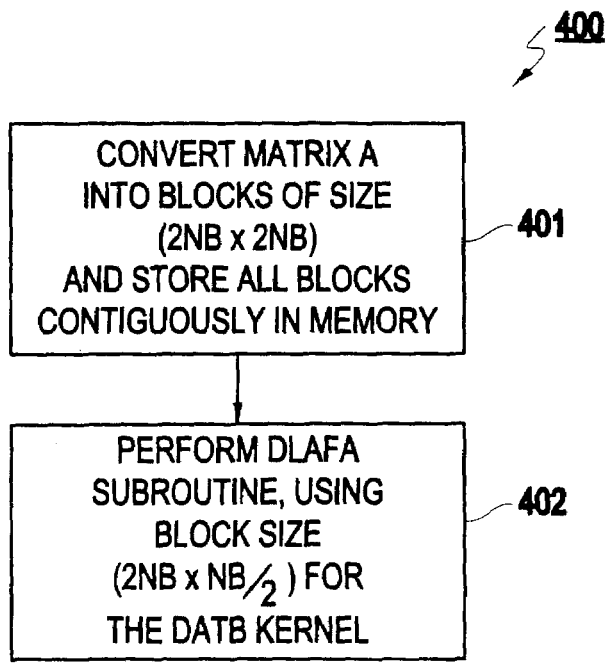
FIG. 4 is an exemplary flowchart 400 for the conversion into cache block size of the present invention, as it would relate to existing subroutines for matrix processing.

One exemplary method of implementing the present invention into an existing DLAFA program is shown in flowchart 400 in FIG. 4. Starting with a given DLAFA in code form, the matrix A is first mapped in step 401 into the new data structure (NDS) with a square block size of 2NB. In general, the order N of a matrix is not a multiple of 2NB. In that case, the last block rows and columns will still be rectangular. However, for ease of addressing and other processing, these rectangular blocks can be padded with zeroes or ones (e.g., dummy values), so that all blocks will be square blocks of size 2NB. The padding is chosen so that it provides no effect on the computations (since a*0=0, a+0=a, and a*1=a).

In step 402, the DLAFA program is executed using the matrix data retrieved from memory, mostly of block size 2NB-by-NB/2, for the DATB kernel.

A DLAFA typically proceeds from left to right. The submatrices to the right of the computational "front" are stored column-wise (i.e., in block column-major format), while the submatrices to the left of the front are stored row-wise. In some cases, it may be necessary to transpose a square block during factorization. This causes no problems, as matrix or submatrix transposition of a square matrix can be done in-place. Having submatrices to the left stored by row as square blocks and submatrices to the right stored by column is all that is required.

Storing matrices in this form yields optimal performance for the level 3 L1 DATB kernel type. The DLAFA becomes, for the most part, a series of calls to DATB with little or no additional copy overhead.

Although it might seem intuitive that a block size based on double the dimension of the L1 cache would hinder performance for matrix multiplication, the reason that this approach works is that the portion of the matrix brought into the cache with each block allows a complete multiplication of that block. That is, the present invention takes advantage of recognizing that matrix multiplication does not require square blocking of the matrix, as commonly viewed in conventional techniques.

Thus, rather than working with the NB×NB square block size that is arguably the conventional wisdom, the present invention recognizes that a double-dimension size (2NB) can be used to optimize performance, when broken down into a plurality (e.g., four) rectangular blocks 401 of size 2NB×NB/2. Each 2NB×NB/2 rectangular block 401 will be completely processed individually as a cache-resident block for the matrix multiplication subroutine.

Typically, in a machine in which memory is accessed in increments of line size, preferably the matrix data is laid out contiguously in memory in "stride one" form, where "stride one" means that the data is retrieved in increments of a line. Therefore, in machines having a line size, according to the present invention, the matrix data is preferably contiguously stored into and preferably retrieved from memory in increments of the machine line size.

As mentioned earlier, the present invention is actually more general in scope than the exemplary "double blocking" embodiment discussed above. Thus, double blocking is a specific instance of a more general concept referred to as "composite blocking".

In the more general concept, a cache block would have row and column dimensions m by k. Here, m divides k (e.g., k=a*m, where a is an integer).

To process a square block of size $k^2$, one calls the DGEMM kernel "a" times with submatrices, each being size m by k, since $k^2=k*k=(a*m)*(a*m)=a*(m*(a*m))=a*(m*k)$. When a=4, m=N/2, and k=2*N, the special case of double blocking occurs, as described above.

In addition to the hardware/software environment described above and shown in FIG. 1, a different aspect of the invention includes a computer-implemented method for performing the invention, as residing in various types of signal-bearing storage media.

This aspect of the present invention is directed to a programmed product, comprising signal-bearing storage media tangibly embodying a program of machine-readable instructions executable by a digital data processor incorporating the CPU 111 and hardware above, to perform the method of the invention.

This signal-bearing storage media may include, for example, a RAM contained within the CPU 111, as represented by the fast-access storage for example. Alternatively, the instructions may be contained in another signal-bearing storage media, such as a magnetic data storage diskette 150, directly or indirectly accessible by the CPU 111.

Whether contained in the diskette 150, the computer/CPU 111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including instructions stored for transmission media, such as instructions stored in digital and analog formats, and instructions stored in stored devices in communication links and wireless.

The second exemplary aspect of the present invention additionally raises the issue of general implementation of the present invention in a variety of ways.

For example, it should be apparent, after having read the discussion above that the present invention could be implemented by custom designing a computer to have a specific cache size. Knowing this cache size, it would then be straightforward to implement an operating system to execute memory control for linear algebra processing in accordance with the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which the cache size is not known until a software module has been loaded or downloaded onto a specific machine and the software module would contain instructions that directly or indirectly query the machine for information relating to the cache size. Having received the cache size, the software module could then interface with existing linear algebra processing modules, such as a BLAS or other LAPACK module, to incorporate the principles of the present invention.

That is, the principles and methods of the present invention could be embodied as a computerized tool stored on a memory unit, such as independent diskette 150, that contains a series of matrix subroutines to solve scientific and engineering problems using matrix processing, as modified by the technique described above in which cache size is incorporated throughout the entire computerized tool. The matrix subroutines, or the exemplary conversion method discussed above, could be stored in memory as part of a math library, as is well known in the art.

Alternatively, diskette 150 could contain a series of instructions or subroutines that allow an existing tool stored elsewhere (e.g., on a CD-ROM) to be modified to incorporate one or more of the features of the present invention which will be described shortly. It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how the size of the L1 cache can be utilized more effectively in performing linear algebra calculations.

In yet another aspect of the present invention, it should also be apparent to one of skill in the art that the principles discussed herein for executing matrix subroutines described or referred to herein can be downloaded through a network interface from a remote storage facility, or that the present invention could be implemented in various methods that include transporting information derived from the method taught in the present invention either via an internet or otherwise.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all these various methods of using the present invention, including the end user who uses the present invention indirectly by receiving the results of matrix processing done in accordance with the principles of the present invention.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of increasing at least one of efficiency and speed in executing a matrix subroutine on a computer, said method comprising:

for a cache on said computer having a working area size defined by dimensions k and m, k and m being integers greater than 1, with k>m, determining an integer a and, for data of a matrix to be processed by said matrix subroutine, a square block of matrix data having a size $(a*m) \times (a*m)$, such that $k \geq (a*m)$; and preliminarily storing data contiguously for a matrix subroutine call in a computer memory in an increment block size that is based on said cache working area size, a first dimension of said block size being $(a*m)$ and a second dimension of said block size being m, thereby a of said increment blocks constitute said square block of matrix data of size $(a*m) \times (a*m)$, and each said increment block fits into said cache working area having said dimensions defined by k and m.

2. The method of claim 1, further comprising:

retrieving said data from said memory in units of said increment block; and executing at least one matrix subroutine using said data.

3. The method of claim 2, wherein said at least one matrix subroutine comprises a subroutine from a LAPACK (Linear Algebra PACKage).

4. The method of claim 2, wherein said subroutine operates on an increment block of data as a result of a single call on this data.

5. A method of providing a service, said method comprising an execution of a matrix subroutine in accordance with the method of claim 2.

6. The method of claim 1, wherein a=4, m=N/2, and k=2*N, N being an integer, said composite blocking thereby comprising a double blocking.

7. The method of claim 1, wherein said cache comprises an L1 or L2 cache, said L1 or L2 cache comprising a cache closest to at least one of a Central Processing Unit (CPU) and a Floating-point Processing Unit (FPU) of a computer system associated with said computer memory.

8. The method of claim 1, wherein said matrix data is loaded contiguously in said memory in increments of a memory line size LS and data is retrievable from said memory in units of LS.

9. The method of claim 1, wherein at least one said block has dummy values for padding to fill in a remainder of the block.

10. An apparatus, comprising:
a processor for processing a matrix subroutine;
a cache associated with said processor, said cache having a working area size defined by dimensions k and m, k and m being integers greater than 1;
and a memory, wherein said memory stores data for memory calls of said matrix subroutine as contiguous data in an increment block size that is based on dimensions of said cache working area size and loads said blocks of data into said cache for said matrix subroutine processing;
wherein said processor determines an integer a and, for data of a matrix to be processed by said matrix subroutine, a square block of matrix data having a size (a*m)×(a*m), such that k≧(a*m), and a first dimension of said increment block size is (a*m) and a second dimension of said block is m, thereby a of said increment blocks constitute said square block of matrix data of size (a*m)×(a*m) and each said increment block of size (a*m)×m fits into said cache working area defined by k and m.

11. The apparatus of claim 10, wherein a=4, m=N/2, and k=2*N, N being an integer, said composite blocking thereby comprising a double blocking.

12. The apparatus of claim 10, wherein said matrix subroutine comprises a subroutine from a LAPACK (Linear Algebra PACKage).

13. The apparatus of claim 10, wherein a line size of said memory is LS and data is retrieved from said memory in units of LS, each said block of data being retrieved by usually an integral number of memory line retrievals.

14. A non-transitory signal-bearing storage device comprising a machine-readable medium tangibly embodying a program of machine-readable instructions executable by a digital processing apparatus, said instructions including a method of storing data for a matrix subroutine call in a computer memory in an increment block size that is based on a cache size of said computer, said cache having a working area size defined by dimensions k and m, where k and m are integers greater than 1 and k>m, said method comprising:
determining an integer a and, for data of a matrix to be processed by said matrix subroutine, a square block of matrix data having a size (a*m)×(a*m), such that k≧(a*m); and
preliminarily storing data contiguously for a matrix subroutine call in a computer memory in an increment block size that is based on said cache working area size, a first dimension of said block size being (a*m) and a second dimension of said block size being m, thereby a of said increment blocks constitute a square block of matrix data and each said increment block of size (a*m)×m fits into said cache working area defined by k and m.

15. The storage device of claim 14, wherein said matrix subroutine comprises a subroutine from a LAPACK (Linear Algebra PACKage).

16. The storage medium of claim 14, wherein a=4, m=N/2, and k=2*N, N being an integer, said composite blocking thereby comprising a double blocking.

17. The storage medium of claim 14, wherein a line size of said memory is LS and data is retrieved from said memory in units of LS, each said block of data being retrieved by usually an integral number of memory line retrievals.

* * * * *